May 18, 1965  W. ZEIDLER  3,183,684

SPLINE SHAFT CONNECTIONS

Filed Jan. 22, 1962

Inventor:
Willi Zeidler
By
Watson Cole Grindle & Watson
Attys.

United States Patent Office 3,183,684
Patented May 18, 1965

3,183,684
SPLINE SHAFT CONNECTIONS
Willi Zeidler, Dusseldorf, Germany, assignor to Firma Rheinmetall G.m.b.H., Dusseldorf, Germany
Filed Jan. 22, 1962, Ser. No. 167,544
Claims priority, application Germany, Jan. 31, 1961, R 29,565
4 Claims. (Cl. 64—23)

The invention relates to spline shaft connections with telescoping or axial movement, more particularly for universal joint shafting, comprising a splined shaft sleeve and a splined shaft capable of axial movement therein, both these components being secured against relative rotational motion by engaging internal and external splines on the components.

It is one main disadvantage of shaft jointings of that known type that they are very difficult to move axially, and are subject to a comparatively great amount of wear. Also, great accuracy is required in manufacture which renders production expensive. In addition, such a joint has no torsional flexibility and does not allow any relative rotational movement between the splined sleeve and splined shaft. To provide torsional flexibility requires additional means which further increases the cost of the joint.

It is an object of the present invention to overcome the disadvantages, which have been described briefly above, of the known type of joint; and in accordance with the present invention, flexible members are inserted, preferably in a state of compression, between neighbouring flanks of the internal and external splines of the two shaft elements of such a joint, that is to say, between the splined sleeve and the splined shaft.

The members may be of rubber, a flexible plastic, or some other like material. The members may have cylindrical, spherical, or disc-shape or any other suitable form. If a disc-shape is used, the members may be barrelled on their outer periphery.

On rotation taking place of the splined shaft relative to the splined sleeve, the members positioned in the direction of such rotation will be compressed whilst those positioned in the opposite direction will enlarge elastically but only by an amount to prevent them to move loosely— i.e. with lateral clearance—in their guideways which are formed between the internal and external splines.

Preferably, the tip of the external splines more particularly of the splined shaft is with advantage in contact with the bottom of the internal splines more particularly of the splined sleeve, which provides a central position of the two shafts relative to one another.

The flexible members are located in their respective guideways one behind the other so that they can move with respect to these guideways in case of axial movements of the shafts.

Thus, a joint embodying the invention has not only torsional flexibility but also easier axial movement. In addition, noise is considerably reduced.

In order to reduce friction between the parts which have relative rolling motion, the members can with advantage be made of a self-lubricating resilient material.

In addition the internal and external splines respectively may have their flanks, but also their end faces, covered with a plastic having, with advantage, self-lubricating properties.

The invention will now be explained in greater detail with reference to the accompanying drawing in which.

Figure 1:
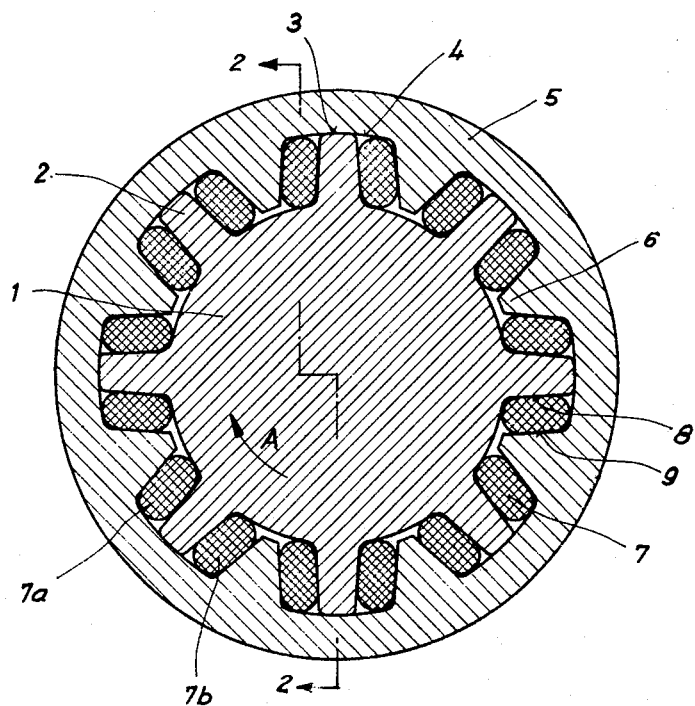
FIG. 1 is a cross section of a spline shaft connection with roll members.
Figure 2:
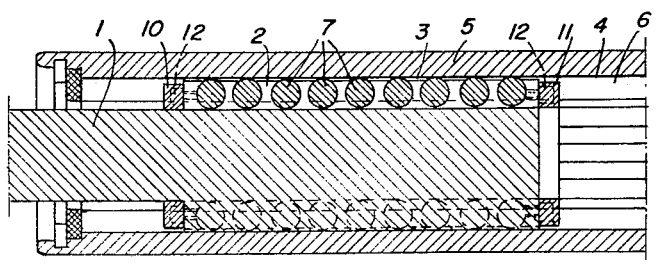
FIG. 2 is a longitudinal section of the spline shaft connection taken on line 2—2 of FIG. 1 in the direction of the arrows.

Referring to the drawing, the periphery of the splined shaft 1 is provided with longitudinal, external splines 2 whose tips 3 are in contact with the bottoms 4 of the internal splines of the splined sleeve 5 thereby centering the splined components 1 and 5 with respect to one another.

The splined sleeve 5 is provided with suitable internal splines 6.

Members 7 of a resilient material are located between the flanks of the external splines 2 and the internal splines 6 such that under normal conditions the two sides of each member are in contact with the flanks. The members are with advantage assembled in a state of compression and they may be of any suitable shape allowing easy rolling and flexible behaviour. With advantage they are of conical, cylindrical or disc shape when not compressed.

When axial movement takes place between the two shafts 1 and 5 the members 7 is of appropriate shape roll along their guideways which are formed by the flanks 8 of the external splines 2 and the flanks 9 and spline bottoms of the internal splines 6. The rolling friction and the flexibility of the rollers considerably reduces the resistance to motion as compared with known embodiments.

Also as a roll member 7 may be provided in one guideway, it is likewise possible to provide a plurality of roll members one behind the other in each guideway. So that the roll members 7 shall remain in their track when the shafts 1 and 5 slide relative to each other, it is necessary to provide the track ends with stop means or safety devices. Such devices can take the form of rings 10 and 11 which themselves abut against both sides of the splines 2 and the spline shaft 1 and are held by screws 12 removably to the spline teeth 2.

When rotary movement takes place between the two shafts 1 and 5, e.g. by a movement of the splined shaft 1 in the direction of the arrow A relative to the splined sleeve 5, the roller labelled 7a is compressed whilst that labelled 7b is allowed to expand but only enough to enable it still to retain contact with the flanks of the splines forming its guideway. If it has been assembled in a state of compression, it will still be in a state of compression in its guideway after said movement.

When rotary movement takes place opposite to the direction of the arrow A the reverse state of affairs will obtain.

What I claim is:

1. A telescopic shaft connection capable of axial movement comprising a shaft having a plurality of spaced external splines projecting therefrom forming spaces between adjacent splines, a sleeve having a plurality of spaced internal splines, each projecting inwardly in a space between adjacent splines on the shaft with clearance on each side of the splines, and elastic rolling members, one in each space adjacent splines of both the shaft and the sleeve and forming rolling members when axial movement takes place and each arranged along the side surfaces of the splines of the shaft and sleeve to permit axial movement of the shaft and sleeve, each external spline of the shaft being in contact with a bottom surface between two adjacent splines of the sleeve with a clearance of the end of each spline of the sleeve in the space between adjacent splines of the shaft.

2. A telescopic shaft connection according to claim 1, in which the elastic rolling members are each composed of a self-lubricating elastic material.

3. A telescopic shaft connection according to claim 1, in which the elastic rolling members are each of round configuration in cross-section when uncompressed between the respective splines.

4. A telescopic shaft connection according to claim 1, in which the elastic rolling members are each of cylindrical configuration in cross section when uncompressed between the respective splines.

References Cited by the Examiner
UNITED STATES PATENTS

| | | | |
|---|---|---|---|
| 1,425,616 | 8/22 | Tarbox | 64—14 |
| 1,443,440 | 1/23 | Spicer et al. | 64—14 |
| 2,343,839 | 3/44 | Austin | 64—14 |
| 2,621,493 | 12/52 | Croset | 64—14 |
| 2,764,003 | 9/56 | Croset | 64—14 |
| 2,961,856 | 11/60 | Selzer | 64—14 |

ROBERT C. RIORDON, *Primary Examiner.*

WALTER A. SCHEEL, *Examiner.*